US011942239B2

(12) United States Patent
Huang

(10) Patent No.: US 11,942,239 B2
(45) Date of Patent: Mar. 26, 2024

(54) MANUFACTURING METHOD OF CONDUCTIVE FILM

(71) Applicant: WUHAN CHINA STAR OPTOELECTRONICS TECHNOLOGY CO., LTD., Hubei (CN)

(72) Inventor: Jianlong Huang, Hubei (CN)

(73) Assignee: WUHAN CHINA STAR OPTOELECTRONICS TECHNOLOGY CO., LTD, Hubei (CN)

( * ) Notice: Subject to any disclaimer, the term of this patent is extended or adjusted under 35 U.S.C. 154(b) by 828 days.

(21) Appl. No.: 16/979,185

(22) PCT Filed: Jul. 21, 2020

(86) PCT No.: PCT/CN2020/103196

§ 371 (c)(1),
(2) Date: Sep. 9, 2020

(87) PCT Pub. No.: WO2022/000605

PCT Pub. Date: Jan. 6, 2022

(65) Prior Publication Data

US 2023/0113605 A1 Apr. 13, 2023

(30) Foreign Application Priority Data

Jun. 28, 2020 (CN) ......................... 202010596512.4

(51) Int. Cl.
*H01B 5/00* (2006.01)
*H01B 1/02* (2006.01)
*H01B 13/00* (2006.01)
*H01B 13/008* (2006.01)

(52) U.S. Cl.
CPC ................. *H01B 5/00* (2013.01); *H01B 1/02* (2013.01); *H01B 13/0036* (2013.01); *H01B 13/008* (2013.01); *Y10T 29/49155* (2015.01)

(58) Field of Classification Search
CPC ............... H01L 21/02488; H01L 27/12; H01L 21/02672; H01B 5/00; H01B 5/14; H01B 5/16; Y10T 29/49155
USPC ........................... 29/846, 825, 829, 847, 885
See application file for complete search history.

(56) References Cited

U.S. PATENT DOCUMENTS

| | | | |
|---|---|---|---|
| 11,398,505 B2 * | 7/2022 | Bao | H01L 27/1259 |
| 2003/0127648 A1 | 7/2003 | Yamazaki | |
| 2013/0038571 A1 | 2/2013 | Ho | |

FOREIGN PATENT DOCUMENTS

| | | |
|---|---|---|
| CN | 102929454 A | 2/2013 |
| CN | 103365013 A | 10/2013 |
| CN | 107170679 A | 9/2017 |
| CN | 108735761 A | 11/2018 |
| CN | 109256399 A | 1/2019 |

(Continued)

*Primary Examiner* — Thiem D Phan
(74) *Attorney, Agent, or Firm* — SOROKER AGMON NORDMAN RIBA

(57) ABSTRACT

The present application provides a conductive film, a manufacturing method of the conductive film, and a display device. The present application prevents refracted light by using a first metal layer to fully cover a second metal layer of a middle layer, thereby fundamentally solving black level stripes caused by lateral etching of the second metal layer.

4 Claims, 3 Drawing Sheets

(56) References Cited

FOREIGN PATENT DOCUMENTS

| | | | | |
|---|---|---|---|---|
| CN | 110098236 A | | 8/2019 | |
| CN | 110462830 A | | 11/2019 | |
| JP | 5131505 | * | 1/2013 | ......... G02F 1/13363 |

* cited by examiner

MANUFACTURING METHOD OF CONDUCTIVE FILM

FIELD OF INVENTION

The present application is related to the field of display technology, and specifically, to a conductive film, a manufacturing method of the conductive film, and a display device.

BACKGROUND OF INVENTION

In panel industry, SD is a signal transmission channel, which generally adopts a Ti/Al/Ti three-layer structure. The Ti layer at a bottom is connected to poly-Si, and because the Ti layer has a relatively low barrier, a good ohmic contact can be formed. The Al layer in a middle is a main body of SD, and a conductivity of the Al layer is relatively good, and a signal can be transmitted quickly. On one hand, the Ti layer on a top can protect the Al layer and reduce oxidation, and on the other hand, the Ti layer can prevent a problem of abnormal overlap caused by bulging of the Al layer during heating. With continuous improvement of performance of mobile phones, an impedance of SD is required to be smaller and smaller. Currently, increasing a thickness of the Al layer of SD is a main method. SD is formed by sequentially forming three layers of metal in a same manufacturing process. Because etching speed of the Ti layer is slower than etching speed of the Al layer, SD forms a lateral etching, and black level stripes appear when lighting due to light refraction.

SUMMARY OF INVENTION

The present application provides a conductive film, a manufacturing method of the conductive film, and a display device to solve a problem of black level stripes.

The manufacturing method of the conductive film provided by an embodiment of the present application includes:

providing a substrate, wherein the substrate includes a first surface and a second surface, which are opposite to each other;

forming a first metal layer and a second metal layer on the first surface, wherein the first metal layer is positioned on the first surface, and the second metal layer is positioned on a surface of the first metal layer away from the substrate; and forming a third metal layer on a surface of the second metal layer away from the substrate, wherein the third metal layer fully covers edges of the second metal layer and contacts the first metal layer.

In an embodiment, after forming the first metal layer and the second metal layer on the first surface, the manufacturing method includes:

etching the first metal layer and the second metal layer.

In an embodiment, after forming the third metal layer on the surface of the second metal layer away from the substrate, the manufacturing method includes:

etching the third metal layer.

In an embodiment, after etching the third metal layer, the manufacturing method includes:

forming a complete conductive film with the first metal layer, the second metal layer, and the third metal layer.

In an embodiment, after etching the third metal layer, the manufacturing method includes:

forming a light-shielding layer on a surface of the third metal layer away from the substrate, wherein the light-shielding layer shields reflected light on two opposite sides of the second metal layer.

In an embodiment, material of the first metal layer and the third metal layer includes titanium, and material of the second metal layer includes aluminum.

In an embodiment, a thickness of the second metal layer ranges from 4500 to 5500 angstroms (Å).

In an embodiment, a thickness of the second metal layer is 5000 angstroms (Å).

The conductive film provided by an embodiment of the present application includes:

a first metal layer including an upper surface and a lower surface, which are opposite to each other;

a second metal layer disposed on the upper surface; and a third metal layer disposed on a surface of the second metal layer away from the first metal layer, wherein the third metal layer covers edges of the second metal layer and contacts the first metal layer.

In an embodiment, material of the first metal layer and the third metal layer includes titanium, and material of the second metal layer includes aluminum.

In an embodiment, a thickness of the second metal layer ranges from 4500 to 5500 angstroms (Å).

In an embodiment, a thickness of the second metal layer is 5000 angstroms (Å).

In an embodiment, the first metal layer, the second metal layer, and the third metal layer form a complete conductive film.

In an embodiment, the first metal layer fully covers the second metal layer.

The display device provided by an embodiment of the present application includes a conductive film, and the conductive film includes:

a first metal layer including an upper surface and a lower surface, which are opposite to each other;

a second metal layer disposed on the upper surface; and a third metal layer disposed on a surface of the second metal layer away from the first metal layer, wherein the third metal layer covers edges of the second metal layer and contacts the first metal layer.

In an embodiment, material of the first metal layer and the third metal layer includes titanium, and material of the second metal layer includes aluminum.

In an embodiment, a thickness of the second metal layer ranges from 4500 to 5500 angstroms (Å).

In an embodiment, a thickness of the second metal layer is 5000 angstroms (Å).

In an embodiment, the first metal layer, the second metal layer, and the third metal layer form a complete conductive film.

In an embodiment, the first metal layer fully covers the second metal layer.

The present application provides the conductive film, the manufacturing method of the conductive film, and the display device. The manufacturing method of the conductive film firstly provides the substrate, wherein the substrate includes the first surface and the second surface, which are opposite to each other; forms the first metal layer and the second metal layer on the first surface, wherein the first metal layer is positioned on the first surface, and the second metal layer is positioned on the surface of the first metal layer away from the substrate; and forms the third metal layer on the surface of the second metal layer away from the substrate, wherein the third metal layer fully covers edges of the second metal layer and contacts the first metal layer. The present application prevents refracted light by using the first metal layer to fully cover the second metal layer of a middle layer, thereby fundamentally solving the black level stripes caused by lateral etching of the second metal layer.

DESCRIPTION OF DRAWINGS

In order to describe technical solutions in the present application clearly, drawings to be used in the description of embodiments will be described briefly below.

Obviously, drawings described below are only for some embodiments of the present application, and other drawings can be obtained by those skilled in the art based on these drawings without creative efforts.

DETAILED DESCRIPTION OF PREFERRED EMBODIMENTS

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the of the present application.

Direction terms mentioned by the present application, for example "upper," "lower," "front," "rear" "left," "right," "inner," "outer," etc. are merely directions in the appended drawings for only explaining and illustrating the present application. The orientation or positional relationship is only for the convenience of describing the present application and simplifying the description, and does not indicate or imply that the device or element referred to must have a specific orientation, structure and operation in a specific orientation, and should not be viewed as limitations of the present application.

The present application provides a conductive film, a manufacturing method of the conductive film, and a display device. The manufacturing method of the conductive film is described in detail below.

Figure 1:
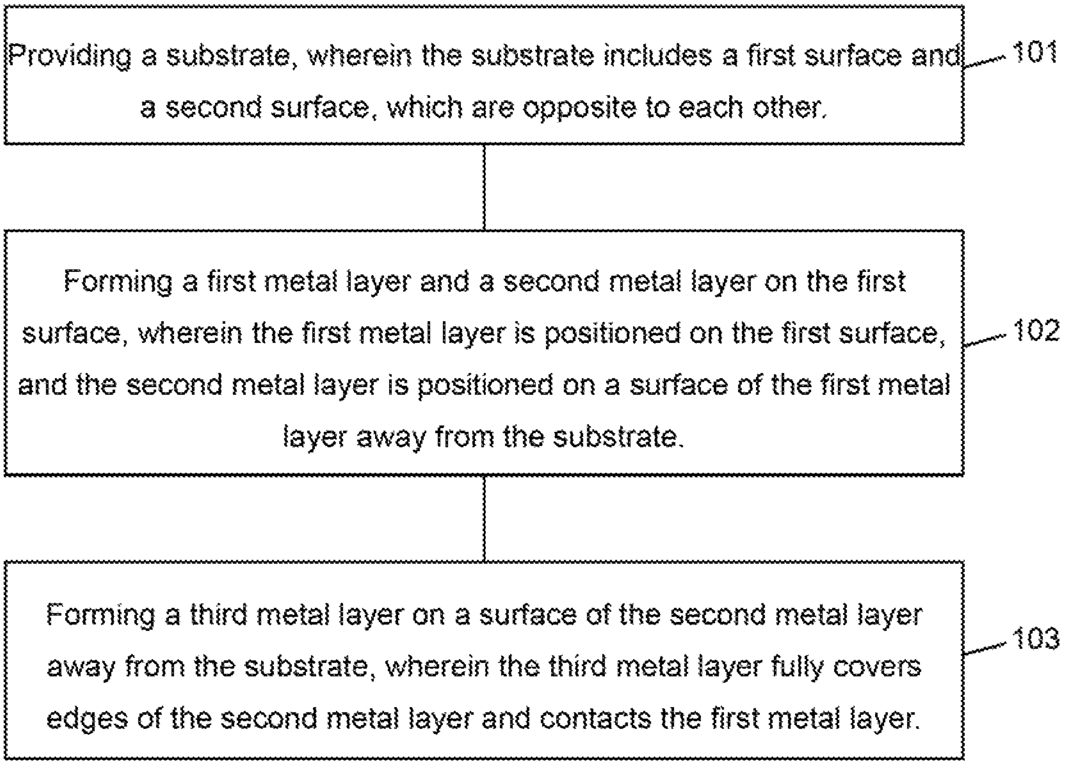
FIG. 1 is a flowchart of a manufacturing method of a conductive film provided by an embodiment of the present application.
Figure 2:
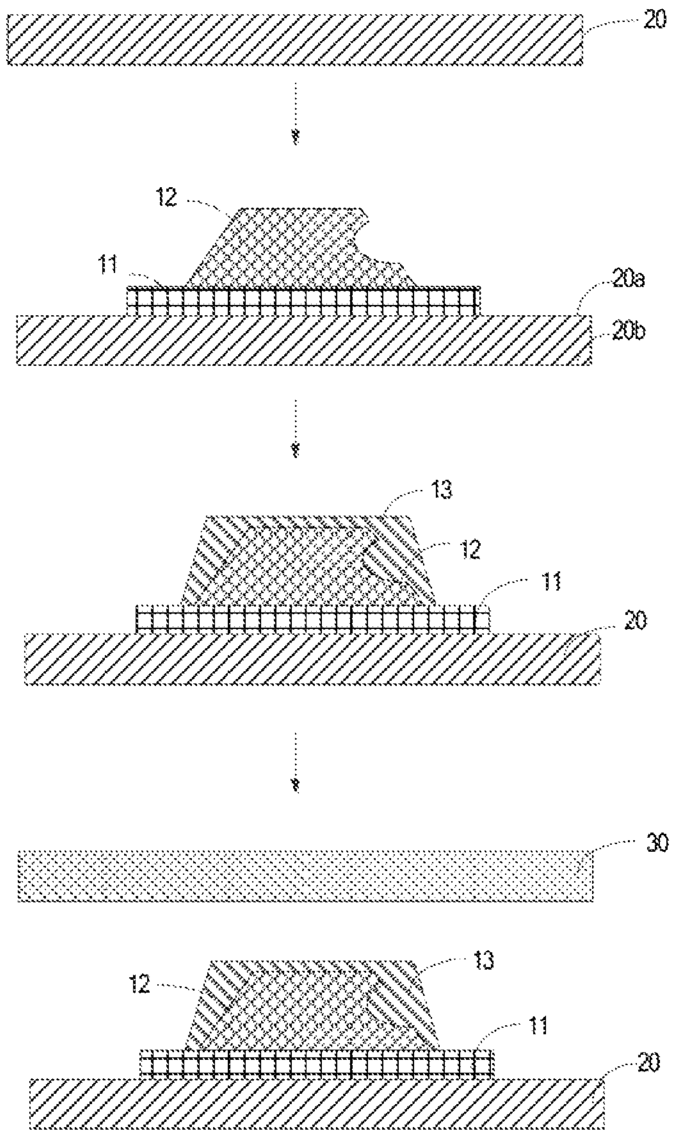
FIG. 2 is a schematic diagram of scenes of the manufacturing method of the conductive film provided by an embodiment of the present application.

Please refer to FIGS. 1 and 2. FIG. 1 is a flowchart of a manufacturing method of the conductive film provided by an embodiment of the present application. FIG. 2 is a schematic diagram of scenes of the manufacturing method of the conductive film provided by an embodiment of the present application. The manufacturing method of the conductive film includes steps of:

101, providing a substrate 20, wherein the substrate 20 includes a first surface 20*a* and a second surface 20*b*, which are opposite to each other.

It should be explained that the substrate 20 can be an array substrate. Generally, the first surface 20*a* is an upper surface 11*a* of the substrate 20, and the second surface 20*b* is a lower surface 11*b* of the substrate 20. Of course, in an embodiment, positions of the first surface 20*a* and the second surface 20*b* can also be exchanged.

102, forming a first metal layer 11 and a second metal layer 12 on the first surface 20*a*, wherein the first metal layer 11 is positioned on the first surface 20*a*, and the second metal layer 12 is positioned on a surface of the first metal layer 11 away from the substrate 20.

It should be explained that the first metal layer 11 and the second metal layer 12 can be formed on the first surface 20*a* by processes such as coating/exposure, development, etching, and photoresist removal.

In an embodiment, after forming the first metal layer 11 and the second metal layer 12 on the first surface 20*a*, the manufacturing method includes:

etching the first metal layer 11 and the second metal layer 12.

It should be explained that the first metal layer 11 is made of titanium, and the second metal layer 12 is made of aluminum. When the first metal layer 11 and the second metal layer 12 are etched, because etching speed of the second metal layer 12 is faster than etching speed of the first metal layer 11, the second metal layer 12 is narrower than the first metal layer 11, which is more convenient for a third metal layer 13 to cover the second metal layer 12.

103, forming the third metal layer 13 on a surface of the second metal layer 12 away from the substrate 20, wherein the third metal layer 13 fully covers edges of the second metal layer 12 and contacts the first metal layer 11.

It should be explained that the third metal layer 13 can be formed by processes such as coating/exposure, development, etching, and photoresist removal. Meanwhile, the third metal layer 13 covers the second metal layer 12 to prevent a side surface of the second metal layer 12 from refracting light, thereby preventing a phenomenon of black level stripes from occurring.

In an embodiment, after forming the third metal layer on the surface of the second metal layer away from the substrate, the manufacturing method includes:

(1) etching the third metal layer 13.

It should be explained that the third metal layer 13 is etched, so that the first metal layer 11, the second metal layer 12, and the third metal layer 13 form a complete conductive film 10.

In an embodiment, after etching the third metal layer 13, the manufacturing method includes:

(1) forming a light-shielding layer 30 on a surface of the third metal layer 13 away from the substrate 20, wherein the light-shielding layer 30 shields reflected light on two opposite sides of the second metal layer 12.

It should be explained that the light-shielding layer 30 shields reflected light on two opposite sides of the second metal layer 12, which can further prevent the display device 100 from causing the black level stripes.

In an embodiment, the first metal layer 11 and the third metal layer 13 are made of titanium, and the second metal layer 12 is made of aluminum.

Understandably, the first metal layer 11, the second metal layer 12, and the third metal layer 13 can also be made of other metal materials. Specific metal materials used for the first metal layer 11, the second metal layer 12, and the third metal layer 13 are not limited in the present application.

In an embodiment, a thickness of the second metal layer 12 ranges from 4500 to 5500 angstroms (Å).

It should be explained that the thickness of the second metal layer 12 can be 4500 Å, 5000 Å, 5200 Å, and 5500 Å. Compared with a metal layer in the prior art, the thickness of the second metal layer 12 is thicker, which can reduce an impedance of the conductive film 10. However, because the thickness of the second metal layer 12 is thicker, refraction is easier to occur at the edges of the second metal layer 12, which causes the black level stripes. The above structure of the present application can prevent the edges of the second metal layer 12 from causing the refraction, thereby preventing the black level stripes from occurring.

The manufacturing method of the conductive film 10 of the present application firstly provides the substrate 20, wherein the substrate 20 includes the first surface 20*a* and the second surface 20*b*, which are opposite to each other; forms the first metal layer 11 and the second metal layer 12 on the first surface 20*a*, wherein the first metal layer 11 is positioned on the first surface 20*a*, and the second metal layer 12 is positioned on the surface of the first metal layer 11 away from the substrate 20; and forms the third metal layer 13 on the surface of the second metal layer 12 away from the substrate 20, wherein the third metal layer 13 fully covers edges of the second metal layer 12 and contacts the first metal layer 11. The present application prevents refracted light by using the first metal layer 11 to fully cover the second metal layer 12 of a middle layer, thereby fundamentally solving the black level stripes caused by lateral etching of the second metal layer 12.

Figure 3:
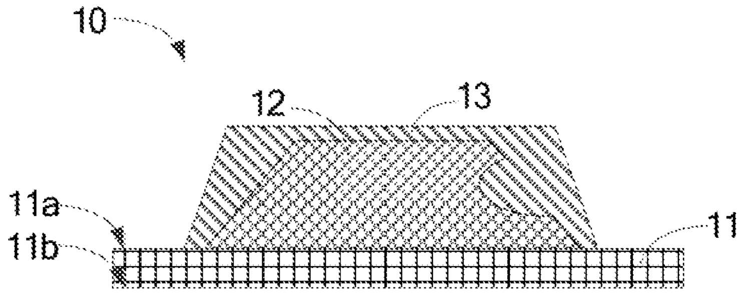
FIG. 3 is a structural schematic diagram of the conductive film provided by an embodiment of the present application.

Please refer to FIG. 3. FIG. 3 is a structural schematic diagram of the conductive film provided by an embodiment of the present application. The conductive film 10 provided by the present application includes a first metal layer 11, a second metal layer 12, and a third metal layer 13. The first metal layer 11 includes an upper surface 11*a* and a lower surface 11*b*, which are opposite to each other. The second metal layer 12 is disposed on the upper surface 11*a*. The third metal layer 13 is disposed on a surface of the second metal layer 12 away from the first metal layer 11, wherein the third metal layer 13 covers edges of the second metal layer 12 and contacts the first metal layer 11.

The first metal layer 11 and the third metal layer 13 are made of titanium, and the second metal layer 12 is made of aluminum. Understandably, the first metal layer 11, the second metal layer 12, and the third metal layer 13 can also be made of other metal materials. Specific metal materials used for the first metal layer 11, the second metal layer 12, and the third metal layer 13 are not limited in the present application.

A thickness of the second metal layer 12 ranges from 4500 to 5500 angstroms (Å). The thickness of the second metal layer 12 can be 4500 Å, 5000 Å, 5200 Å, and 5500 Å. Compared with a metal layer in the prior art, the thickness of the second metal layer 12 is thicker, which can reduce an impedance of the conductive film 10. However, because the thickness of the second metal layer 12 is thicker, refraction is easier to occur at the edges of the second metal layer 12, which causes the black level stripes. The above structure of the present application can prevent the edges of the second metal layer 12 from causing the refraction, thereby preventing the black level stripes from occurring.

The present application prevents refracted light by using the first metal layer 11 to fully cover the second metal layer 12 of a middle layer, thereby fundamentally solving the black level stripes caused by lateral etching of the second metal layer 12.

Figure 4:
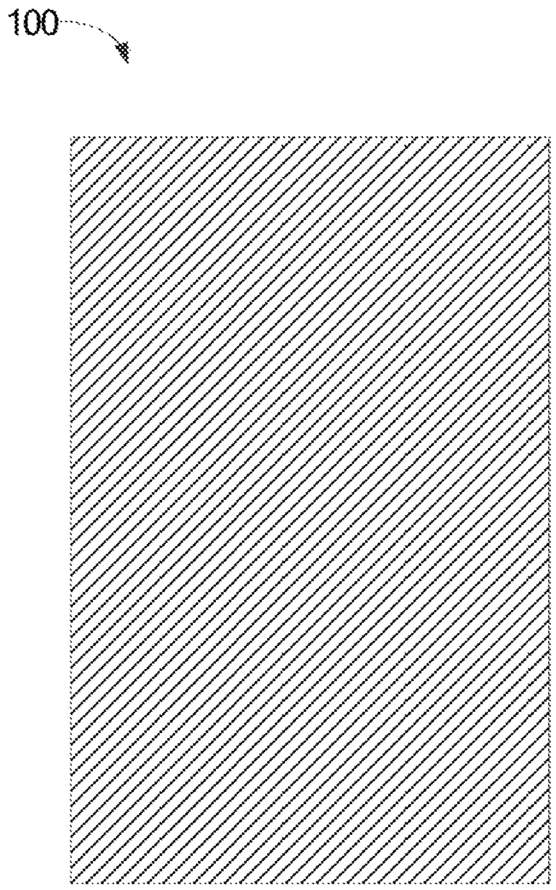
FIG. 4 is a structural schematic diagram of a display device provided by an embodiment of the present application.

Please refer to FIG. 4. FIG. 4 is a structural schematic diagram of the display device provided by an embodiment of the present application. The present application provides the display device 100 including the above conductive film 10. Because the conductive film 10 is described in detail in the above embodiments, the conductive film 10 is not described in detail in this embodiment of the present application.

The display device provided by the present application prevents refracted light by using the first metal layer to fully cover the second metal layer of a middle layer, thereby fundamentally solving the black level stripes caused by lateral etching of the second metal layer.

The conductive film, the manufacturing method of the conductive film, and the display device provided by the present application is described in detail above, the specific examples of this document are used to explain principles and embodiments of the present application, and the description of embodiments above is only for helping to understand the present application. Meanwhile, those skilled in the art will be able to change the specific embodiments and the scope of the present application according to the idea of the present application. In the above, the content of the specification should not be construed as limiting the present application. Above all, the content of the specification should not be the limitation of the present application.

What is claimed is:

1. A manufacturing method of a conductive film, comprising following steps:

providing a substrate, wherein the substrate comprises a first surface and a second surface, which are opposite to each other;

forming a first metal layer and a second metal layer on the first surface, wherein the first metal layer is positioned on the first surface, and the second metal layer is positioned on a surface of the first metal layer away from the substrate; and forming a third metal layer on a surface of the second metal layer away from the substrate, wherein the third metal layer fully covers edges of the second metal layer and contacts the first metal layer;

etching the first metal layer and the second metal layer after forming the first metal layer and the second metal layer on the first surface;

etching the third metal layer after forming the third metal layer on the surface of the second metal layer away from the substrate;

forming a complete conductive film with the first metal layer, the second metal layer, and the third metal layer after etching the third metal layer; and forming a light-shielding layer on a surface of the third metal layer away from the substrate;

wherein the light-shielding layer shields reflected light on two opposite sides of the second metal layer after etching the third metal layer.

2. The manufacturing method of the conductive film according to claim 1, wherein material of the first metal layer and the third metal layer comprises titanium, and material of the second metal layer comprises aluminum.

3. The manufacturing method of the conductive film according to claim 1, wherein a thickness of the second metal layer ranges from 4500 to 5500 angstroms (Å).

4. The manufacturing method of the conductive film according to claim 1, wherein a thickness of the second metal layer is 5000 angstroms (Å).

* * * * *